United States Patent Office 3,512,891
Patented May 19, 1970

3,512,891
SPHERICAL INTERFEROMETER
Richard R. Baldwin, Clinton, Tenn., assignor to the United States of America as represented by the United States Atomic Energy Commission
Filed Apr. 18 1968, Ser. No. 722,446
Int. Cl. G03b 27/12
U.S. Cl. 356—109
4 Claims

ABSTRACT OF THE DISCLOSURE

A Michelson white-light interferometer is modified to provide, as a key component thereof, a special optical objective which converts a plane wave front to a spherical wave front, reflects the latter normally off the spherical segment of a workpiece being analyzed, and re-converts the reflected spherical wave front to a plane wave front, and the latter plane wave front from the objective and the plane wave front from an adjustable reference mirror are then combined interferometrically such that the simultaneous inspection of a plurality of radii is effected.

Background of the Invention

This invention was made in the course of, or under, a contract with the U.S. Atomic Energy Commission.

The field of art to which the invention pertains is for an optical interferometer for determining the radial uniformity of a surface segment of a spherical sample.

A typical white-light interferometer of the Michelson type of the prior art is not capable of determining simultaneously whether any one of a plurality of radii of a spherical part under inspection is out-of-tolerance from a design value for the reasons which follow.

To illustrate the inability of a Michelson instrument to simultaneously inspect a plurality of radii, assume that components 5, 10, and 23 have been removed from the arrangement of FIG. 1 of the present invention and that the resulting Michelson interferometer, which is then typical of prior art devices, has been properly adjusted for inspection of the outside surface of a hemisphere 14 whose geometrical center is designated as point 0. Under these conditions, the two plane wave fronts leaving the beamsplitter 20 impinge on the hemisphere 14 and on the reference mirror 25 which is now in alignment with the beamsplitter 20, and the wave fronts are reflected as a spherical wave front and a plane wave front, respectively. Those light beams which impinge normally on the hemisphere 14 are reflected back upon themselves to the beamsplitter 20, where they combine interferometrically with the reflected reference wave from the mirror 25. If the reference mirror is positioned so that the beam paths are of equal length, the combined waves generate circular fringes which can be observed through an aperture in the plate 6. The presence of these fringes, which are very small and thus observable only with a powerful microscope, indicates that the distance from the beamsplitter to the reference mirror is equal to the distance from the beamsplitter to the nearest portion of the hemisphere. Because these fringes are generated only by those rays which are nearly normal to the hemispherical surface, the fringes represent only a very small area of the hemisphere. Assuming that the distance from the point 0 to this small area has been measured very carefully by some other means, the reference mirror micrometer 16 could be calibrated in terms of this distance. Then theoretically at least, the hemisphere could be rotated in one or more planes to obtain what would be in effect a series of single-radius measurements. Very careful and accurate rotation would be required, a large number of measurements would be necessary, and observation of the fringes would be difficult. In other words, from a practical standpoint the standard Michelson interferometer is not a suitable means for determining by means of a single measurement whether the surface of a part being inspected is a true spherical segment or whether any of the radii for a major portion of the surface differ from design value by more than a few millionths of an inch in a manner to be described below for the present invention.

SUMMARY OF THE INVENTION

Considering the limitations of the prior art, as discussed above, it is the object of the present invention to provide an optical white light interferometer for the inspection of either convex or concave surfaces wherein any departure from a design value of any of the radii of a major portion of a spherical segment of a surface under inspection can be determined from a single measurement.

The above object has been accomplished in the present invention by providing a specially constructed optical objective, to be described in detail hereinbelow, which is mounted immediately in front of a hemisphere or part under inspection to receive the measuring light beam from the beamsplitter of the interferometer, and a Porro prism assembly is provided between the beamsplitter and the reference mirror of the interferometer to provide a reflected reference wave for combining interferometically with the plane wave front reflected back from the objective. The special objective is designed such that it converts a plane wave front to a spherical wave front, reflects the latter normally off the spherical segment of a workpiece being inspected, and re-converts the reflected spherical wave front to a plane wave front and directs the latter to the beamsplitter, such that a plurality of radii are simultaneously inspected to determine if any one of such radii deviates from a given design value. Thus, it is possible by utilizing the present invention to determine with a single measurement whether a spherical segment is truly spherical. This could not be accomplished by prior art devices since a plurality of measurements were necessary to achieve the same end results that are accomplished by the present invention with a single measurement.

DESCRIPTION OF THE PREFERRED EMBODIMENT

Figure 1:
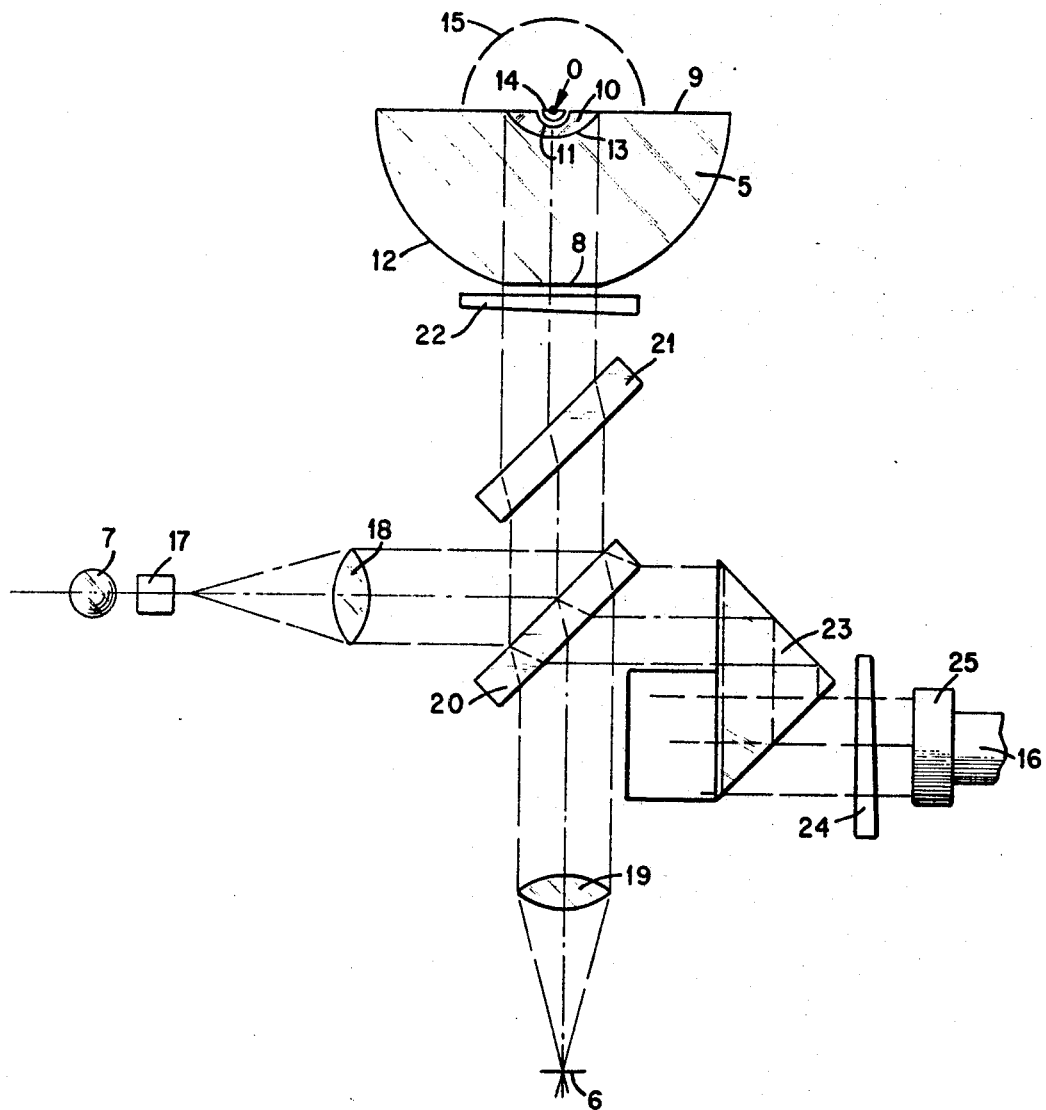
FIG. 1 is a schematic diagram of the interferometer of the present invention.

In FIG. 1, a special optical device 5 referred to herein as an "objective" is mounted immediately in front of a hemisphere 14 being inspected to receive the measuring light beam from a beamsplitter 20. The objective 5 is formed from a solid hemisphere of optical-quality glass. As shown, the objective 5 is positioned with its polar region 8 toward the beamsplitter 20 and with its base 9 toward the part 14 to be inspected. The polar radius of the objective is coincident with the centerline of the measuring light beam. The geometric center of the objective 5 is designated as point 0.

The polar region 8 of the objective 5 is flat and is parallel with the base 9. With the exception of surfaces 8 and 9, which are coated with an anti-reflection agent, the surface 12 of the objective 5 is fully silvered for maximum reflection of light. As shown in FIG. 1 and also in FIG. 2, the central portion of the base 9 is cut away to snugly receive a paraboloid 10 composed of glass having properties identical to those of the glass composing the objective 5. The outer face of the paraboloid lies in the same plane as the base 9 and is cut away centrally to provide an anti-reflective surface 11 which is concentric with the fully silvered surface 12 of the objective 5. The inner surface 13 of the insert 10 is parabolic and is 20% silvered, and the focal point of the parabolic surface coincides with the center 0 of the objective 5.

Figure 2:
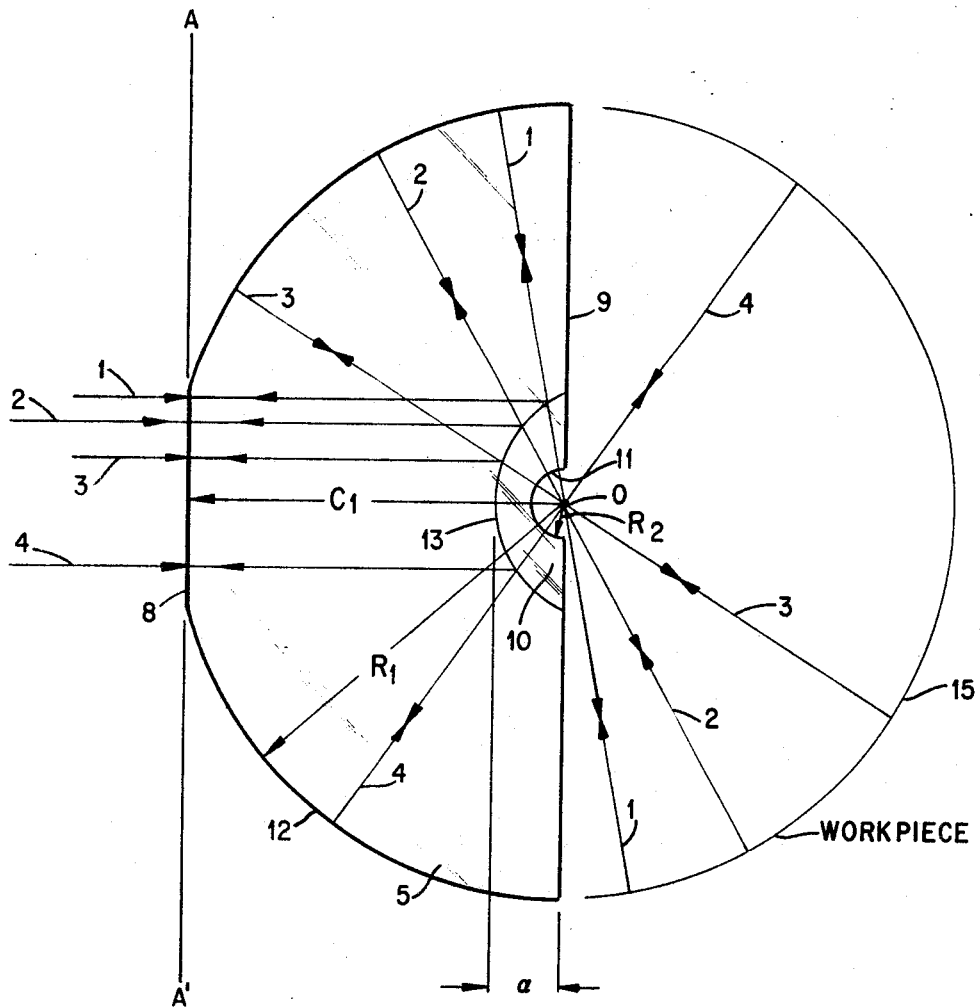
FIG. 2 is an exploded or enlarged view of the special optical objective and a typical workpiece of the system of FIG. 1.

The objective 5 of FIG. 1 and FIG. 2 is not as large as is shown in these figures and particularly FIG. 2 is very much enlarged to better illustrate the principles of operation of the present invention as discussed hereinbelow. For example, in FIG. 2, the actual radius $R_1$ is 1 inch, the flat polar region 8 has a ½ inch diameter which coincides with the base portion of the insert 10, the radius $R_2$ is 3/32 inch, and the focal length $a$ of the paraboloid insert 10 is .1250 inch.

A source 7 of white light provides a beam of light which passes through a microscope objective 17 and then through a beam collimator 18. The light beam from the collimator 18 impinges upon a beamsplitter 20 which is designed to direct about 86% of the light to the objective 5 through a compensator 21 and an optical wedge 22, and to direct about 14% to a reference mirror 25 through a Porro prism assembly 23 and an optical wedge 24. The major portion of the incoming light beam is directed to the objective 5 for the reason that the light rays entering the objective are then reflected several times and are subject to an appreciable loss in intensity.

The objective 5 with its insert 10 was designed in order to provide light paths of the kind required for the proper operation of the spherical interferometer which will be fully described hereinafter. The specifications for the light paths in the objective 5 and insert 10, as shown more clearly in FIG. 2 where a planar wave front of white light is partially shown by typical rays 1, 2, 3, and 4, are as follows:

(1) Path length of rays 1, 2, 3, and 4 must be equal from the polar region 8, defined by the line A—A, to point 0.

(2) Path length through glass of rays 1, 2, 3, and 4 must be equal from A-A' to 0. Glass path to 0 equals: $2R_1 + C_1 - R_2 - 2a$, where: $R_1$=outside radius of glass; $C_1$=height of A-A' above 0; $R_2$=inside radius of glass; and $a$=focal length of paraboloid.

(3) Optical glass path length through Porro prism 23 of FIG. 1 must be nearly equal to the glass path through the objective 5 and insert 10 as described in the preceding note.

(4) The material used for the objective 5, insert 10, and the Porro prism 23 is interferometer-quality optical glass, fully annealed, free from inclusions and striations, and taken from the same melt.

As mentioned above, white light incident on the beamsplitter 20 is diverted into two plane wave fronts, one of which is directed to the objective 5 and the other to the prism 23 and reference mirror 25. The light reflected by the reference mirror 25 returns as a plane wave front to the beamsplitter 20. The plane wave front incident on the polar region 8 of the objective 5 is transmitted to the 20% silvered parabolic surface 13 of the insert 10, where it is in part transmitted and in part reflected. That part of the wave front close to the polar radius of the objective is reflected back upon itself to the beamsplitter 20. The remaining (and larger) part of the wave front is reflected from the surface 13 as an expanding spherical wave front which impinges on the fully silvered surface 12 of the objective 5 and is everywhere reflected back upon itself, forming a converging spherical front whose focal point is at 0. Most of this converging spherical front is transmitted through the parabolic surface 13 and issues normally from the non-reflective surface 11 of the insert 10. The merging convergent wave front impinges on the surface of the hemispherical test piece 14 of FIG. 1 or the test piece 15 of FIG. 2 and is reflected normally back upon itself to the surface 13 of the insert 10 where it is converted back to a plane wave front which is directed back to the polar region 8 and then back to the beamsplitter 20, where it combines with the reflected reference wave from the reference mirror 25. If the micrometer 16 is adjusted to equalize the beam paths, the plane waves combine interferometrically to generate the well known straight, zero-order white-light fringe, which can be observed through an aperture in the plate 6 after being collimated by a collimator 19. The generation of fringes which are straight to one white-light fringe or better indicates that the hemispherical test piece 14, or 15, is in fact centered on the point 0 and that all of the points viewed on the surface thereof have virtually the same radius.

Using a test piece of known and constant radius as a standard, the inspection procedure outlined above provides a means of calibrating and adjusting the interferometer. For a given objective size, the dimensions of the insert 10 control the maximum size of test pieces used for calibration and the extent of the solid angle that can be viewed. Thus, the size of the insert represents a compromise in the range of usefulness of the instrument. In the present invention, the insert has been chosen so as to allow a 0.125-inch diameter standard, which is regarded as a suitable compromise providing for a readily manipulatable test piece. It should be evident that the above-described device is useful chiefly for concave surfaces, such as the surface 15, since convex surfaces that can be inspected are limited to about ⅛ inch in diameter.

If a workpiece being inspected has been carefully centered and the micrometer has been accurately adjusted, any appreciable variations of any of the radii of the inspected area will be indicated by distortion, or even by the absence, of the usual zero-order pattern. Thus, in contrast to the standard Michelson interferometer previously described, the spherical interferometer of the present invention permits the simultaneous inspection of myriad radii. The generation of an essentially straight fringe pattern representing these radii indicates that none of them varies more than a known small amount (e.g. ±0.000010 inch) from the read-out of the micrometer. This precision is obtained when measuring convex radii up to 0.0625 inch and concave radii up to 1.875 inches. However, it should be understood that the interferometer of the present invention is adapted for measuring concave radii which exceed the value of 1.875 inches and, in fact, it can be utilized for inspecting concave workpieces with any radii and particularly with substantially larger radii than the above value, if desired, with a slightly less precision than that stated above.

As mentioned above, a small part of the plane wave front impinging upon the polar region 8 of the objective 5 is reflected normally back upon itself by the parabolic surface 13 and thus is not impinged on the spherical segment of the workpiece 14 under inspection. Thus, a small central part of the surface under inspection is not sampled. If, however, a concave surface, such as 15 in FIG. 2, is centered on point 0, the spherical interferometer will inspect a spherical area corresponding to about 150° of the part.

It should be evident from the above description that the interferometer of the present invention can be used to inspect concave or convex workpieces without contacting or rotating the workpiece and that such an inspection can be accomplished in a rapid and accurate manner with a single measurement.

In addition, if the segment of the workpiece to be inspected is being machined or lapped, the inspection can be conducted with the segment installed on the lathe or lapping apparatus which could not be accomplished heretofore where a plurality of independent, sequential radius measurements were required for a complete inspection of the workpiece.

This invention has been described by way of illustration rather than by limitation and it should be understood that it is equally applicable in fields other than those described.

What is claimed is:

1. An improved white-light interferometer for the simultaneous inspection of a myriad radii of a spherical part of a workpiece to determine any out-of-tolerance of any of such radii, consisting essentially of a source of white light, a beamsplitter positioned for receiving a light beam from said source, a reference mirror, a micrometer affixed to said reference mirror for adjusting and indicating the position of said mirror, a Porro prism interposed between said beamsplitter and said reference mirror, an interferometer objective positioned between said beamsplitter and said spherical part to be inspected, said objective being formed from a solid hemisphere of optical-quality glass and having a flat polar region positioned toward said beamsplitter and with its base toward said part, said flat polar region being parallel to said base with the polar radius of the objective being coincident with the centerline of the measuring light beam, the central portion of said objective base being cut away to snugly receive a paraboloid composed of optical glass with the outer face thereof lying in the same plane as said objective base and with the central portion of the outer face of the paraboloid being cut away to provide an anti-reflective surface which is concentric with the outer hemisphere surface portion of said objective, the inner surface of said paraboloid being 20% silvered, the flat polar region of said objective being coated with an anti-reflection agent with the remaining surface of said objective being fully silvered for maximum reflection of light, said beamsplitter being silvered to direct a major portion of said light beam to said objective and a minor portion thereof to said reference mirror through said Porro prism, said objective converting a plane wave front from said beamsplitter to an expanding spherical wave front and then into a converging spherical wave front onto said spherical part, and the outer surface of said paraboloid converting the wave front reflected by said part to a plane wave front and directs such a converted plane wave front back to said beamsplitter where it is combined with the reference plane wave front reflected back from said reference mirror, said micrometer being adjustable to equalize the respective beam paths, whereby said reflective plane waves combine interferometrically at said beamsplitter to provide straight, zero order white-light fringes as an indication of any out-of-tolerance of said inspected part.

2. The interferometer of claim 1, wherein said spherical part is convex.

3. The interferometer of claim 1, wherein said spherical part is concave.

4. The interferometer of claim 1, wherein said objective has an outside radius of 1 inch, said flat polar region of said objective is ½ inch in diameter, said outer face of said paraboloid is ½ inch in diameter, said cut-away central concentric surface of said paraboloid has a radius of 3/32 inch, and the focal length of said paraboloid is 0.1250 inch, said interferometer being adapted to measure convex radii up to 0.0625 inch and concave radii up to 1.875 inches with a precision of ±0.000010 inch.

References Cited
UNITED STATES PATENTS 3,028,782   4/1962   Bernhardt et al. _____ 356—109

RONALD L. WIBERT, Primary Examiner

C. CLARK, Assistant Examiner